Nov. 11, 1952     L. C. RUBIN     2,617,152
TRANSFER MOLDING OF PERFLUOROCHLOROCARBON PLASTIC
Filed Dec. 31, 1949
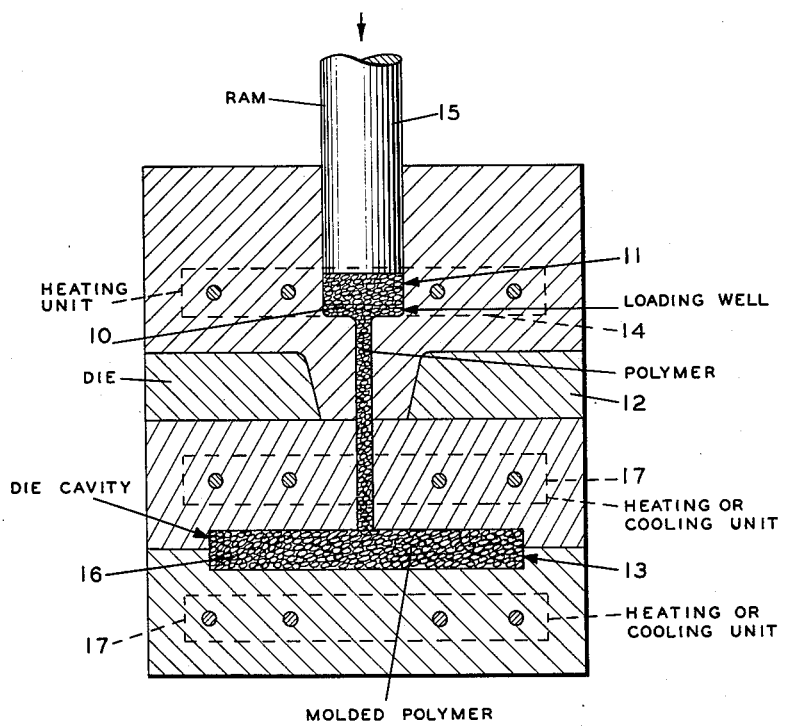
INVENTOR.
LOUIS C. RUBIN
BY
ATTORNEYS Patented Nov. 11, 1952

2,617,152

UNITED STATES PATENT OFFICE 2,617,152

TRANSFER MOLDING OF PERFLUORO-CHLOROCARBON PLASTIC

Louis C. Rubin, West Caldwell, N. J., assignor to The M. W. Kellogg Company, Jersey City, N. J., a corporation of Delaware Application December 31, 1949, Serial No 136,404

11 Claims. (Cl. 18—55)

This invention relates to the treatment of perfluorochlorocarbon plastics, and more specifically to the treatment of polytrifluorochloroethylene plastics. In another aspect, the invention relates to the transfer molding of polymers of trifluorochloroethylene for the purpose of forming articles of such material.

The preparation of the monomer, trifluorochloroethylene, is accomplished by dechlorinating Freon 113 (1, 1-2 trifluorotrichloroethane), under suitable conditions of dehalogenation in the presence of a solvent, such as methyl alcohol, and a metallic dehalogenating agent, such as zinc dust, to produce an effluent comprising the monomer trifluorochloroethylene, including unreacted trifluorochloroethylene and solvent. This effluent is next passed to a suitable fractional distillation system in which substantially pure trifluorochloroethylene is recovered as a relatively low boiling fraction.

The monomer thus obtained, is polymerized under suitable polymerization conditions, with or without the presence of a suitable catalyst or promoter. Such conditions may comprise the use of a suitable catalyst comprising an organic peroxide, such as bi-trichloroacetyl peroxide preferably dissolved in a suitable solvent, such as trichlorofluoromethane, at a temperature between about −20° C., and preferably at a temperature of about −16° C. At a temperature of about −16° C. the polymerization of trifluorochloroethylene to the solid polymer in a suitable yield is accomplished in about seven days. At elevated temperatures, less time is required to complete the polymerization. After the desired extent of polymerization, the resulting polymerization reaction mixture is removed from the polymerization zone and the polymeric product is recovered from the solvent for the catalyst or polymerizing agent.

The polymers of trifluorochloroethylene possess certain desirable, physical and chemical characteristics, with four-fifths of the weight being supplied by the two halogens, fluorine and chlorine. These polymers are colorless and transparent, and have been found to possess a high chemical stability, with no effect being observed on the polymer after prolonged exposure to concentrated sulfuric, hydrofluoric and hydrochloric acid, strong caustic, fuming nitric acid, aqua regia, and other vigorous oxidizing materials. The polymer is hard but not brittle and is flowable at temperatures above about 500° F. In addition, the polymer is flexible and resilient, and is not wetted by water or affected by high humidity. However, great care and a novel method of molding are required in forming molded articles of these plastics, inasmuch as they tend to change their physical characteristics to varying degrees under the influence of the molding temperature.

It is an object of this invention to provide an improved method of transfer molding adapted to the forming of articles of polymers of trifluorochloroethylene.

Various other objects and advantages of the present invention may be apparent to those skilled in the art from the accompanying description and disclosure.

According to the invention, employing suitable transfer molding apparatus as more specifically hereinafter described, a plastic composed essentially of polytrifluorochloroethylene prepared in granular or powdered form in accordance with the practice followed in the preparation of other plastics for molding, is placed in the transfer pot or loading well. The loading well is maintained at a temperature between about 415° F. and about 625° F. under suitable compacting pressure between about 500 and about 25,000 pounds per square inch, for a time sufficient to permit the granular mass to reach a plastic condition. The softened granular mass is then displaced through the opening or gate of the loading well into the lower mold or die cavity, by the action of the upper portion of the mold acting as a piston. The die cavity is maintained at a temperature between about 415° F. and about 625° F. under suitable compacting pressure between about 500 and about 25,000 pounds per square inch, for a time sufficient to permit the plastic to assume the internal contour of the die and attain the size and shape of the desired article. The die is subsequently cooled under properly regulated operating conditions of temperature and pressure, depending upon the degree of crystallization desired, and the formed article is then removed.

The production of polytrifluorochloroethylene by the previously described process has been found to result in the formation of polymers of varying molecular weights. It has, therefore, been found that the optimum operating conditions employed for forming the desired articles from the plastic polymer will be governed to a large extent by the molecular weight of the polymer produced. It has also been found, however, that in practice, it is impractical to ascertain these molecular weights under normal circumstances. Accordingly, a sample test has been devised which provides a direct indication of the proper molding temperature. The test comprises measurements of the temperature at which no tensile strength is exhibited under the conditions of the test. This test is applied to a standard or test piece of the plastic material. This temperature is referred to as the "no strength temperature" or "no strength temperature value" and is abbreviated N. S. T. Accordingly, the N. S. T. value serves as a useful guide in the molding of plastics, and has particular applicability to plastics composed essentially of polytrifluorochloroethylene.

The measurement of the N. S. T. value is carried out in suitable apparatus, on a strip of the plastic, measuring 2″ by ⅛″ by 1/16″. Conveniently, such strips may be cut from a 1/16″ sheet and notched or grooved in a straight line across one large surface at the center transversely to the longitudinal axis. The notch or groove is made perfectly straight and extended to a depth of 1/64″. The strength test is then applied to the point of minimum cross-section. The sample is suspended vertically, with a small weight (approximately 4″ long), suspended from the lower end of the test strip on a fine wire. The above-mentioned weight is so adjusted that the total weight from the notch down is 0.5 gram. The test piece is suspended in a suitable chamber whose internal temperature is brought up to 410° F. and is thereafter raised at a rate of 2.7° F. per minute until the sample pulls apart at the notch. The N. S. T. value is the temperature at which the test strip is pulled in two. This determination is not highly sensitive to small variations in test strip thickness (±0.003″). However, care must be taken to cut a sharp, clean notch of uniform depth. Differences of 10° F. are normally considered significant.

In carrying out the molding operation of polytrifluorochloroethylene under the aforementioned conditions of temperature and pressure, the optimum operating conditions are determined by the particular N. S. T. value of the polytrifluorochloroethylene. It has been found that the N. S. T. value of the polytrifluorochloroethylene plastic may vary from about 220° C. to about 350° C. and that polymers falling within the range of N. S. T. values may be subsequently treated under the above range of operating conditions. In general, it has been found that as the N. S. T. value increases, the die temperature (which also is intended to cover the temperature imposed upon the transfer pot or loading well) should also be increased, with the pressure remaining constant, to insure the best results. In a given instance, the pressure is that which is required both to place the material in a plastic state in the transfer pot of loading well and that required to mold the material in the die cavity in a sufficiently short time at the temperature selected. It will be found that the pressure required in molding at temperatures in the above-mentioned range will fall within the range between about 700 and about 1,400 pounds per square inch, although in certain instances pressures as low as 500 or as high as 25,000 pounds per square inch may also be employed.

In maintaining compacting pressure on the die cavity between about 700 and about 1,400 pounds per square inch in each instance, it has been found that a polytrifluorochloroethylene plastic having an N. S. T. value of about 240° C. can be satisfactorily pressed at temperatures of between about 445° F. and about 500° F., while a polymer having an N. S. T. value of about 270° C. can be satisfactorily pressed at temperatures between about 465° F. and about 535° F. Similarly, polymers having an N. S. T. value of 300° C. can be satisfactorily pressed at temperatures between about 480° F. and about 590° F. The polytrifluorochloroethylene plastic having a relatively low N. S. T. value, such as 240° C., flows easier at the molding temperature and produces a harder finished article, while polymers having a relatively high N. S. T. value, such as 300° C. are more viscous at the molding temperature but produce a more flexible finished article.

The particular pressing time required for completely converting the stock and forming the finished article within the die cavity under selected operating conditions of temperature and pressure and based upon the respective N. S. T. value, following the transfer of the softened plastic from the loading well, is determined by the thickness of the polytrifluorochloroethylene article to be formed. The following table will serve as a guide for determining suitable pressing periods for the various thicknesses of the polytrifluorochloroethylene plastic stock and grades of material, and represents data obtained when fabricating 2¼″ discs of the polytrifluorochloroethylene plastic within a suitable die cavity.

| N S T value | ° C | 300 | 270 | 240 |
|---|---|---|---|---|
| Molding temperature | ° F | 480 | 480 | 480 |

| Thickness in Inches | Pressing Time in Minutes | | |
|---|---|---|---|
| 0.2 | 10 | 7 | 5 |
| 0.4 | 25 | 20 | 12 |
| 0.6 | 40 | 28 | 20 |
| 0.8 | 55 | 40 | 28 |
| 1.0 | 65 | 50 | 36 |

From the above table, it will be noted that as the N. S. T. value of the polytrifluorochloroethylene plastic increases, the molding or pressing time within the die cavity for a given thickness is also increased; and that for a given N. S. T. value of the plastic the pressing time is also increased as the thickness increases. It will also be noted that as the pressing temperature is raised, in either the transfer pot or the die cavity or both, the pressing time will decrease. Thus for example, a polytrifluorochloroethylene plastic having an N. S. T. value of 300° C. can be pressed in ½ the time at 570° F., which approaches the upper limit of the preferred die cavity temperature range of 480° F.–590° F., for a plastic having the aforementioned N. S. T. value of 300° C.

In the description of the operating conditions for the above-mentioned transfer molding procedure, the stock to be treated has been referred to as a plastic composed essentially of polytrifluorochloroethylene. It should be understood, however, that fillers and plastic compositions other than the polymers of the present invention which do not materially affect the characteristics of polytrifluorochloroethylene, may also be included in the plastic material treated, and that the treatment of such compositions is also within the scope of this invention. In this respect, it has also been found desirable to incorporate plasticizing agents with the polytrifluorochloroethylene plastic to be molded, employing such plasticizers as polytrifluorochloroethylene itself but in an oily or waxy state. When incorporating such plasticizing agents with the polytrifluorochloroethylene plastic to be molded, it is possible to employ the lower temperature within the aforementioned range for a given N. S. T. value of polytrifluorochloroethylene. From an economic standpoint, it is generally preferred to conduct the molding operation as low a temperature as possible.

In carrying out the aforementioned transfer molding of polytrifluorochloroethylene plastics, conventional transfer molding apparatus is employed which is familiar to those skilled in the art, and since the novely of the invention does not reside in the molding apparatus employed, further description thereof is unnecessary. It is preferred, however, that platens be employed which are electrically heated either by resistance, induction, or dielectric heating, and while a separate set of platens may be utilized for subsequent cooling of the die after the stock has been completely converted, it is preferred that one set of platens having both heating and cooling means be employed for efficient operation. The die employed is preferably a high alloy stainless steel or chromium plated high-temperature steel.

In conducting the molding operation, employing apparatus, as shown in the accompanying drawing, which is an elevational view partly in cross-section, a previously determined amount of the polytrifluorochloroethylene plastic stock 10, preferably in granular form, is placed in the transfer pot or loading well 11 of the die 12. The stock may be placed in the loading well 11 with both the latter and die cavity 13 at room temperature, but it is preferred that the loading well 11 and the die cavity 13 be first brought up to a temperature between about 225° F. and about 300° F., by means of heating unit 14, before the actual molding cycle is begun, in order to avoid possible abrasion of the inner surfaces of the loading well 11 by contact with the relatively rough polytrifluorochloroethylene plastic granules 10, and also to avoid a reduction in temperature within the die cavity 13 upon the subsequent transfer of the softened plastic from the loading well 11 into the die cavity 13. Such preheating also is of value in reducing the time required to plasticize the polymer in the actual molding operation within the die cavity 13. If so desired, the stock may be separately preheated in an oven at a temperature substantially below the conversion temperature, and it is desirable to hold the preheated stock at such temperature for about one hour before it is transferred to the loading well 11.

After the stock has been placed in the loading well 11 and is heated to the proper temperature by means of heating unit 14, the minimum time is allowed which is necessary for the molding powder to reach a plastic or softened condition. The softened plastic 10 is then forced into the die cavity 13 by the upper portion of the mold acting as a piston, or, as shown in the drawing, by means of a separate ram 15, under a pressure of approximately 200 pounds per square inch on the stock. When the combined application of heat and pressure causes the granular structure of the plastic to collapse or coalesce, more pressure is applied. When using hydraulic or pneumatic means, (not shown) or ram 15, such coalescence is indicated by a drop of pressure in the chamber. When the pressure begins to drop below 200 pounds per square inch on the press, it is slowly raised to the desired molding pressure which may vary from between about 500 and about 25,000 pounds per square inch, although a pressure between about 700 and about 1,400 pounds per square inch is preferred. The pressure thus applied to the loading well 11 causes the softened or plastic stock 10 to be forced into the die cavity 13. Upon being thus displaced into the die cavity 13, similar conditions of temperature and pressure within the aforementioned ranges are maintained on the softened plastic stock. In raising the pressure within the die cavity 13 to the desired molding pressure, the ram speed is preferably maintained at approximately $\frac{3}{16}$" per minute. The desired molding pressure is maintained on the stock within the die cavity 13 until the die cavity 13 is completely filled and all of the stock is completely converted to the flowable state. The aforementioned table may be employed as a guide for determining the pressing period required for effecting the conversion. It will also be noted that while similar ranges of temperature and pressure conditions are indicated as being maintained on both the loading well 11 and die cavity 13, the particular operating conditions maintained in the loading well 11 may differ from those maintained in the die cavity 13.

As previously indicated, the die 12 is next cooled and the formed article 16 is ejected or removed from the die cavity 13, by separating the halves of the die. Cooling may be merely that which is caused by contact of the die 12 with the atmosphere; but it is desirable in some instances to cool the die 12 rapidly in order to limit crystallization. Such limitations of degree of crystallization will affect the physical properties of the molded article produced from the polytrifluorochloroethylene plastic. These properties have been found to vary from those of an amorphous material to those of a crystalline material. The amorphous material is transparent, softer, tougher and more flexible than the crystallized material. The latter tends to be milky in appearance and hard and resistant to distortion. The degree of crystallization is determined primarily by the rapidity with which the molded polymer is cooled or quenched, to approximately 300° F. from its transition temperature, which is normally above 400° F. The melt viscosity of the polymer being molded will affect the rate of crystallization, so that the higher the N. S. T. value, the lower the rate of crystallization. Similarly, when the N. S. T. value is lowered, the rate of crystallization will be more rapid so that cooling must be more rapid if it is desired to avoid crystallization. For example, quenched polytrifluorochloroethylene plastic having an N. S. T. value of 220° C., while flexible and useful as a film at room temperature, will crystallize fairly rapidly at temperatures as low as 250° F. and become brittle. Quenched polytrifluorochloroethylene plastic with an N. S. T. value of 270° C. will show comparatively little change on heating to the same temperature for prolonged periods, and even if crystallized at even higher temperatures will still retain its toughness.

In cooling the die 12 rapidly in order to limit crystallization, it is preferred to employ low pressure steam as an initial coolant, followed by water, by means of heating or cooling units 17. If the cooling water is turned on, the pressure is quickly raised above the molding pressure to pressures as high as about 35,000 pounds per square inch on the stock in order to avoid shrinkage and to maintain the desired shape of the article. When operating at the preferred molding pressure range of between about 700 and about 1,400 pounds per square inch, it is desirable to raise the pressure between about 7,000 and about 10,000 pounds per square inch. After the pressure has been raised on the stock or molded polymer 16 to the desired point, it is slowly allowed to drop to between about 2000 and about 3000 pounds per square inch by the time the die 12 has reached the temperature between about 70° F. and about 350° F., although a temperature of approximately 250° F. is normally sufficiently low to permit the removal of the finished article. The die 12 is then opened and the finished article 16 is ejected.

While a particular embodiment of the invention has been described for purposes of illustration, it should be understood that various modifications and adaptations thereof which will be obvious to one skilled in the art, may be made within the spirit of the invention without departing from its scope.

I claim:

1. A method for forming articles from a plastic composed essentially of polytrifluorochloroethylene having an N. S. T. value between about 240° C. and about 300° C. which comprises heating said plastic in a loading well at a temperature between about 445° F. and about 590° F. under compacting pressure between about 500 and about 1,400 pounds per square inch for a time sufficient to place said plastic in a softened condition, displacing said softened plastic into a die, maintaining said die at a temperature between about 445° F. and about 590° F. under compacting pressure between about 500 and about 1,400 pounds per square inch for a time sufficient to permit said plastic to assume the internal contour of said die and attain the size and shape of the desired article, subsequently cooling said die at an initial comparting pressure between about 7,000 and about 10,000 pounds per square inch with gradual reduction of said pressure until a temperature between about 70° F. and about 350° F. has been attained, and removing said formed article from said cooled die.

2. A method for forming articles from a plastic composed essentially of polytrifluorochloroethylene having an N. S. T. value between about 240° C. and about 300° C. which comprises heating said plastic in a loading well at a temperature between about 445° F. and about 590° F. under compacting pressure between about 700 and about 1,400 pounds per square inch for a time sufficient to place said plastic in a softened condition, displacing said softened plastic into a die, maintaining said die at a temperature between about 445° F. and about 590° F. under compacting pressure between about 700 and about 1,400 pounds per square inch for a time sufficient to permit said plastic to assume the internal contour of said die and attain the size and shape of the desired article, subsequently cooling said die at an initial compacting pressure between about 7,000 and about 10,000 pounds per square inch with gradual reduction of said pressure until a temperature of about 250° F. has been attained, and removing said formed article from said cooled die.

3. A method for forming articles from a plastic composed essentially of polytrifluorochloroethylene having an N. S. T. value of about 300° C. which comprises heating said plastic in a loading well at a temperature between about 480° F. and about 590° F. under compacting pressure between about 700 and about 1,400 pounds per square inch for a time sufficient to place said plastic in a softened condition, displacing said softened plastic into a die, maintaining said die at a temperature between about 480° F. and about 590° F. under compacting pressure between about 700 and about 1,400 pounds per square inch for a time sufficient to permit said plastic to assume the internal contour of said die and attain the size and shape of the desired article, subsequently cooling said die at an initial compacting pressure between about 7,000 and about 10,000 pounds per square inch with gradual reduction of said pressure until a temperature of about 250° F. has been attained, and removing said formed article from said cooled die.

4. A method for forming articles from a plastic composed essentially of polytrifluorochloroethylene having an N. S. T. value of about 270° C. which comprises heating said plastic in a loading well at a temperature between about 465° F. and about 535° F. under compacting pressure between about 700 and about 1,400 pounds per square inch for a time sufficient to place said plastic in a softened condition, displacing said softened plastic into a die, maintaining said die at a temperature between about 465° F. and about 535° F. under compacting pressure between about 700 and about 1,400 pounds per square inch for a time sufficient to permit said plastic to assume the internal contour of said die and attain the size and shape of the desired article, subsequently cooling said die at an initial compacting pressure between about 7,000 and about 10,000 pounds per square inch with gradual reduction of said pressure until a temperature of about 250° F. has been attained, and removing said formed article from said cooled die.

5. A method for forming articles from a plastic composed essentially of polytrifluorochloroethylene having an N. S. T. value of about 240° C. which comprises heating said plastic in a loading well at a temperature between about 445° F. and about 500° F. under compacting pressure between about 700 and about 1,400 pounds per square inch for a time sufficient to place said plastic in a softened condition, displacing said softened plastic into a die, maintaining said die at a temperature between about 445° F. and about 500° F. under compacting pressure between about 700 and about 1,400 pounds per square inch for a time sufficient to permit said plastic to assume the internal contour of said die and attain the size and shape of the desired article, subsequently cooling said die at an initial compacting pressure between about 7,000 and about 10,000 pounds per square inch with gradual reduction of said pressure until a temperature of about 250° F. has been attained, and removing said formed article from said cooled die.

6. A method for forming articles from a plastic composed essentially of polytrifluorochloroethylene having an N. S. T. value between about 240° C. and about 300° C., said plastic having been prepared by polymerizing the monomer trifluorochloroethylene at a temperature between about −20° C. and about 25° C., which comprises: heating said plastic in a loading well at a temperature between about 445° F. and about 590° F. under compacting pressure between about 500 and about 1,400 pounds per square inch for a time sufficient to place said plastic in a softened condition; displacing said softened plastic into a die; maintaining said die at a temperature between about 445° F. and about 590° F. under compacting pressure between about 500 and about 1,400 pounds per square inch for a time sufficient to permit said plastic to assume the internal contour of said die and attain the size and shape of the desired article; subsequently cooling said die at an initial compacting pressure between about 7000 and about 10,000 pounds per square inch with gradual reduction of said pressure until a temperature between about 70° F. and about 350° F. has been attained; and removing said formed article from said cooled die.

7. A method for forming articles from a plastic composed essentially of polytrifluorochloroethylene having an N. S. T. value between about 240° C. and about 300° C., said plastic having been prepared by polymerizing the monomer trifluorochloroethylene at a temperature between about —20° C. and about 25° C., which comprises: heating said plastic in a loading well at a temperature between about 445° F. and about 590° F. under compacting pressure between about 700 and about 1,400 pounds per square inch for a time sufficient to place said plastic in a softened condition; displacing said softened plastic into a die; maintaining said die at a temperature between about 445° F. and about 590° F. under compacting pressure between about 700 and about 1,400 pounds per square inch for a time sufficient to permit said plastic to assume the internal contour of said die and attain the size and shape of the desired article; subsequently cooling said die at an initial compacting pressure between about 7000 and about 10,000 pounds per square inch with gradual reduction of said pressure until a temperature of about 250° F. has been attained; and removing said formed article from said cooled die.

8. A method for forming articles from a plastic composed essentially of polytrifluorochloroethylene having an N. S. T. value of about 300° C., said plastic having been prepared by polymerizing the monomer trifluorochloroethylene at a temperature between about —20° C. and about 25° C., which comprises: heating said plastic in a loading well at a temperature between about 480° F. and about 590° F. under compacting pressure between about 700 and about 1,400 pounds per square inch for a time sufficient to place said plastic in a softened condition; displacing said softened plastic into a die; maintaining said die at a temperature between about 480° F. and about 590° F. under compacting pressure between about 700 and about 1,400 pounds per square inch for a time sufficient to permit said plastic to assume the internal contour of said die and attain the size and shape of the desired article; subsequently cooling said die at an initial compacting pressure between about 7000 and about 10,000 pounds per square inch with gradual reduction of said pressure until a temperature of about 250° F. has been attained; and removing said formed article from said cooled die.

9. A method for forming articles from a plastic composed essentially of polytrifluorochloroethylene having an N. S. T. value of about 270° C., said plastic having been prepared by polymerizing the monomer trifluorochloroethylene at a temperature between about —20° C. and about 25° C., which comprises: heating said plastic in a loading well at a temperature between about 465° F. and about 535° F. under compacting pressure between about 700 and about 1,400 pounds per square inch for a time sufficient to place said plastic in a softened condition; displacing said softened plastic into a die; maintaining said die at a temperature between about 465° F. and about 535° F. under compacting pressure between about 700 and about 1,400 pounds per square inch for a time sufficient to permit said plastic to assume the internal contour of said die and attain the size and shape of the desired article; subsequently cooling said die at an initial compacting pressure between about 7000 and about 10,000 pounds per square inch with gradual reduction of said pressure until a temperature of about 250° F. has been attained; and removing said formed article from said cooled die.

10. A method for forming articles from a plastic composed essentially of polytrifluorochloroethylene having an N. S. T. value of about 240° C., said plastic having been prepared by polymerizing the monomer trifluorochloroethylene at a temperature between about —20° C. and about 25° C., which comprises: heating said plastic in a loading well at a temperature between about 445° F. and about 500° F. under compacting pressure between about 700 and about 1,400 pounds per square inch for a time sufficient to place said plastic in a softened condition; displacing said softened plastic into a die; maintaining said die at a temperature between about 445° F. and about 500° F. under compacting pressure between about 700 and about 1,400 pounds per square inch for a time sufficient to permit said plastic to assume the internal contour of said die and attain the size and shape of the desired article; subsequently cooling said die at an initial compacting pressure between about 7000 and about 10,000 pounds per square inch with gradual reduction of said pressure until a temperature of about 250° F. has been attained; and removing said formed article from said cooled die.

11. A method for forming articles from a plastic polymer of trifluorochloroethylene which comprises heating said plastic in a loading well at a predetermined temperature and compacting pressure for a time sufficient to place said plastic in a softened condition, displacing said softened plastic into a die, maintaining said die at a predetermined temperature and compacting pressure for a time sufficient to permit said plastic to assume the internal contour of said die and attain the size and shape of the desired article, after forming said plastic article in said die in the aforementioned step maintaining a pressure on said plastic article which at least initially is substantially above said last-mentioned compacting pressure and cooling said plastic article to a temperature below 400° F., and thereafter recovering said plastic article.

LOUIS C. RUBIN.

REFERENCES CITED

The following references are of record in the file of this patent:

UNITED STATES PATENTS

| Number | Name | Date |
|---|---|---|
| 2,303,339 | Dreyfus | Dec. 1, 1942 |

FOREIGN PATENTS

| Number | Country | Date |
|---|---|---|
| 578,168 | Great Britain | June 18, 1946 |

OTHER REFERENCES

"New High Temperature Thermoplastic," Modern Plastics Oct. 1948, pages 168, 170, 172.